United States Patent
Lee et al.

(10) Patent No.: US 8,520,287 B2
(45) Date of Patent: Aug. 27, 2013

(54) PARALLAX BARRIER DEVICE AND FABRICATING METHOD THEREOF

(75) Inventors: Jian-Hong Lee, Changhua County (TW); Jih-Fon Huang, Hsinchu County (TW); Yi-Wen Chung, Pingtung County (TW)

(73) Assignee: Industrial Technology Research Institute, Hsinchu (TW)

( * ) Notice: Subject to any disclaimer, the term of this patent is extended or adjusted under 35 U.S.C. 154(b) by 86 days.

(21) Appl. No.: 13/335,943

(22) Filed: Dec. 23, 2011

(65) Prior Publication Data

US 2012/0162744 A1 Jun. 28, 2012

(30) Foreign Application Priority Data

Dec. 28, 2010 (TW) ................................ 99146382 A
Oct. 3, 2011 (TW) ................................ 100135762 A

(51) Int. Cl.
*G02F 1/153* (2006.01)
*G09G 3/38* (2006.01)

(52) U.S. Cl.
USPC ........................................................ 359/273

(58) Field of Classification Search
USPC .................. 359/265–275; 345/105
See application file for complete search history.

(56) References Cited

U.S. PATENT DOCUMENTS

| 6,137,456 | A | 10/2000 | Bhagavatula et al. | |
|---|---|---|---|---|
| 7,256,923 | B2 * | 8/2007 | Liu et al. | 359/265 |
| 7,532,383 | B2 * | 5/2009 | Jang et al. | 359/266 |
| 7,639,415 | B2 | 12/2009 | Jung et al. | |

FOREIGN PATENT DOCUMENTS

| TW | I296723 | 1/2008 |
|---|---|---|
| TW | M368088 | 11/2009 |
| TW | M371902 | 1/2010 |

* cited by examiner

*Primary Examiner* — Tuyen Tra
(74) *Attorney, Agent, or Firm* — Jianq Chyun IP Office

(57) ABSTRACT

A parallax barrier device includes: a first substrate; a first patterned transparent electrode layer disposed on the first substrate; a first patterned electrochromic material layer disposed on the first patterned transparent electrode layer and including a plurality of electrochromic structures, in which lengths, widths or diameters of the electrochromic structures are 50 nm to 500 nm, and included angles of the electrochromic structures and a surface of the first substrate to be deposited are 30° to 89°; a second substrate; a second patterned transparent electrode layer disposed on the second substrate; a second patterned electrochromic material layer disposed on the second patterned transparent electrode layer; and an electrolyte disposed between the first patterned electrochromic material layer and the second patterned electrochromic material layer.

19 Claims, 7 Drawing Sheets

PARALLAX BARRIER DEVICE AND FABRICATING METHOD THEREOF

CROSS-REFERENCE TO RELATED APPLICATION

This application claims the priority benefit of Taiwan applications serial no. 99146382, filed on Dec. 28, 2010, and Taiwan application serial no. 100135762, filed on Oct. 3, 2011. The entirety of the above-mentioned patent application is hereby incorporated by reference herein and made a part of this specification.

BACKGROUND OF THE INVENTION

1. Technology Field

The disclosure relates to a parallax barrier device and a fabricating method thereof.

2. Description of Related Art

In recent years, the development of stereoscopic image display technologies attracts much attention, especially considering that the spectacle 3D display technology not only has a high cost but also does not meet human demands, and thus the naked-eye 3D display technology is a main trend in the future. At present, a naked-eye stereoscopic image display can be formed, which mainly divides an image into left and right eye display regions, the image is then projected to left and right eyes respectively by using a 2D/3D switching technology such as parallax barrier, lenticular screen or Directional Backlight, and forms a stereoscopic image in the human brain by means of binocular parallax after the left and right eyes receive the image.

In the 2D/3D switching technology, the parallax barrier 2D/3D switching technology is the simplest way to achieve the naked-eye stereoscopic display technology. The existing main architecture is to additionally form a second-layer liquid crystal in a liquid crystal display (LED) device, and then to be able to form non-opaque and opaque strip spaced patterns by controlling the second-layer liquid crystal, so as to simulate the effect of parallax barrier, thereby achieving the left eye and right eye spectroscopic 3D effect.

However, due to the need of a liquid crystal layer and a polarizing plate, the existing parallax barrier 2D/3D switching technology has problems, such as a high cost and a high driving voltage are required, the thickness affects the performance of brilliance, and the technology cannot be used in other displays such as an organic light-emitting diode display, a plasma display, a field emission display, and possible future flexible electronic displays. Therefore, the technology of forming a parallax barrier device in the naked-eye stereoscopic display technology with an electrochromic material is presented for review.

The electrochromic concept mainly indicates that the colour of an electrochromic material may be changed when being applied with an external voltage. For example, when an electrochromic device is applied with a visible light, the electrochromic device essentially may block light penetration of a certain particular wavelength, thereby preventing excessive light from penetrating the electrochromic device, which can be used to adjust incident amount of different wavelength lights.

Since an electrochromic material layer can be fabricated with common sputtering and electroplating methods, the fabrication is simple and has a low cost. Further, since the electrochromic device does not need a polarizer additionally, a controller is easy to be made and brightness influence is low, and the electrochromic device is applicable to many kinds of displays. Furthermore, since the electrochromic device has a low driving voltage and memory characteristics, it can have an energy-saving efficacy. Moreover, since the electrochromic device has low requirements for the substrate, it is applicable to a flexible substrate and can assemble a device externally. Therefore, how to apply the electrochromic device to the stereoscopic display technology practically and effectively and how to overcome coloring state/bleached state contrast and low switching speed are pending issues at present.

SUMMARY OF THE INVENTION

A parallax barrier device and a fabricating method thereof are introduced herein, which can fabricate an electrochromic material layer with higher coloring state/bleached state contrast and switching speed, and thus can form a parallax barrier device with an electrochromic material.

The disclosure provides a parallax barrier device, including: a first substrate; a first patterned transparent electrode layer disposed on the first substrate; a first patterned electrochromic material layer disposed on the first patterned transparent electrode layer including a plurality of electrochromic structures, in which lengths, widths or diameters of the electrochromic structures are 50 nm to 500 nm, and an included angles between the electrochromic structures and a surface of the first substrate to be deposited is 30° to 89°; a second substrate; a second patterned transparent electrode layer disposed relative to the first patterned transparent electrode layer on the second substrate; a second patterned electrochromic material layer disposed relative to the first patterned electrochromic material layer on the second patterned transparent electrode layer; and an electrolyte disposed between the first patterned electrochromic material layer and the second patterned electrochromic material layer.

The disclosure provides a method for fabricating a parallax barrier device, including: forming a first transparent electrode layer on a first substrate; forming a first electrochromic material layer on the first transparent electrode layer, in which a method of forming the first electrochromic material layer includes: rotating the first substrate in a sputtering chamber, and depositing an electrochromic material on the first transparent electrode layer with an oblique sputtering deposition process, in which the oblique sputtering deposition process includes: making an included angle of a normal of a target material relative to a normal of a surface of the substrate to be deposited be 30° to 89°, and charging a process gas in the sputtering chamber to perform a sputtering process; patterning the first electrochromic material layer and the first transparent electrode layer to form a first patterned electrochromic material layer and a first patterned transparent electrode layer; forming a second transparent electrode layer on a second substrate; forming a second electrochromic material layer on the second transparent electrode layer; patterning the second electrochromic material layer and the second transparent electrode layer to form a second patterned electrochromic material layer and a second patterned transparent electrode layer; and providing an electrolyte, and combining and packaging the first substrate and the second substrate in a manner of sandwiching the electrolyte between the first patterned electrochromic material layer and the second patterned electrochromic material layer.

To make the features and advantages of the disclosure more comprehensible, several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
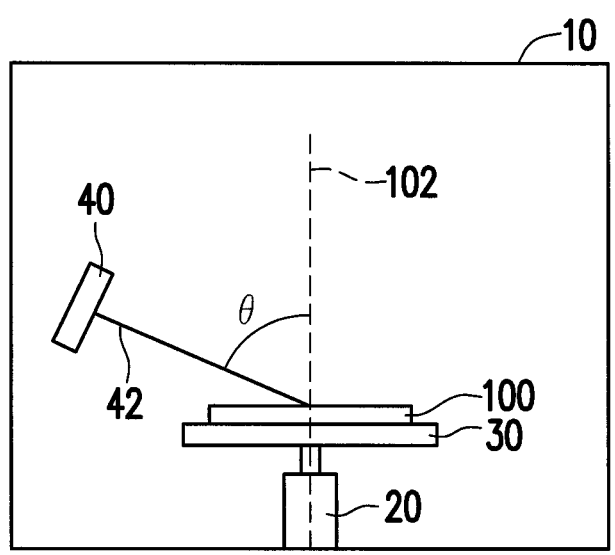
FIG. 1 is a schematic diagram illustrating a sputtering apparatus for fabricating an electrochromic material layer according to the disclosure.

FIG. 1 is a schematic diagram illustrating a sputtering apparatus for fabricating an electrochromic material layer according to the disclosure. Herein, it should be noted that, although FIG. 1 of the disclosure only illustrates main members for describing the sputtering apparatus, persons of ordinary skill in the art shall easily deduce all the members that the sputtering apparatus according to the disclosure shall have based on relevant knowledge, for example, a vacuum member, a power supply member, and a gas supply source not shown in FIG. 1.

Referring to FIG. 1, the sputtering apparatus at least includes a sputtering chamber 10, a rotation member 20, a platform 30, and a target material 40 as a deposition source. The rotation member 20 is, for example, a motor, and the rotation member 20 is connected with the platform 30 to rotate the platform 30. The platform 30 is used to bear a substrate 100, and when the platform 30 is rotated, the substrate 100 disposed thereon may also rotate with it. The target material 40 is disposed in the sputtering chamber 10, and a normal 42 of the target material 40 and a normal 102 of a surface of the substrate to be deposited have an included angle $\theta$. In the case that the included angle $\theta$ is greater than 0°, since the normal 42 of the target material 40 (that is, a deposition path of a target material atom) is oblique relative to the substrate 100, the sputtering deposition process using the target material 40 can be regarded as an oblique sputtering deposition process.

The method for fabricating the electrochromic material layer according to the disclosure mainly includes: rotating a substrate in a sputtering chamber, and then depositing an electrochromic material on the substrate with the oblique sputtering deposition process, so as to form an electrochromic material layer on the substrate. According to the above description about the sputtering apparatus, it can be determined that the sputtering apparatus in FIG. 1 can be used to implement the method for fabricating the electrochromic material layer according to the disclosure. When the method for fabricating the electrochromic material layer according to the disclosure is implemented with the sputtering apparatus in FIG. 1, the rotation member 20 is used to rotate the platform 30 and the substrate 100, the sputtering chamber 10 extracts air in the sputtering chamber 10 by using a vacuum extraction member (not shown), so as to make the sputtering chamber 10 maintain a vacuum state, the gas supply source (not shown) supplies a process gas in the sputtering chamber 10, and the power supply member (not shown) supplies power to the target material 40, so as to sputter the substrate 100 accordingly to form an electrochromic material layer on the substrate 100.

In the above fabricating method, the substrate 100 is, for example, glass, polyethylene terephthalate or polyimide, and a transparent electrode layer may be formed in advance on the surface of the substrate 100 to be deposited. The transparent electrode layer is, for example, indium doped tin oxide (ITO), fluorine doped tin oxide (FTO), Antimony doped tin oxide (ATO) or Zinc oxide (ZnO). The charged process gas is, for example, a mixed gas of argon as a plasma working gas and oxygen as a reaction gas. The target material 40 is, for example, a metal such as W, Ni, V, Ti or Ir, or a ceramic target material such as $WO_3$, $NiO_x$, $V_2O_5$, $TiO_2$ or $IrO_2$. The included angle $\theta$ is, for example, 30° to 89°. A rotation speed of the substrate 100 is, for example, 0.1 to 1000 rpm, and is preferably 0.5 to 100 rpm.

Next, the structure of the electrochromic material layer according to the disclosure is described. The electrochromic material layer according to the disclosure includes a plurality of electrochromic structures, in which lengths, widths or diameters of the electrochromic structures are 50 nm to 500 nm, and when the electrochromic material layer is formed on the substrate, included angles between the electrochromic structures and a surface of the substrate to be deposited are 30° to 89°. Further, the shape of nano-microstructures of the electrochromic material includes a strip shape, a cylindrical shape or a helical-shape, or may be a multi-layer superposition structure. In an exemplary embodiment, the electrochromic material layer includes a plurality of strip-shaped electrochromic structures with a width ranging from about 50 nm to about 500 nm, and the strip-shaped electrochromic structures are arranged at intervals, such that the electrochromic structures have period strip-shaped pitches, and each pitch ranges from about 50 nm to about 500 nm, for instance. Furthermore, the electrochromic material layer is, for example, $WO_3$, $WO_3$ derivatives, $NiO_x$, $NiO_x$ derivatives, $V_2O_5$, $V_2O_5$ derivatives, $TiO_2$, $TiO_2$ derivatives, $IrO_2$, $IrO_2$ derivatives or a combination thereof.

Figure 2A:
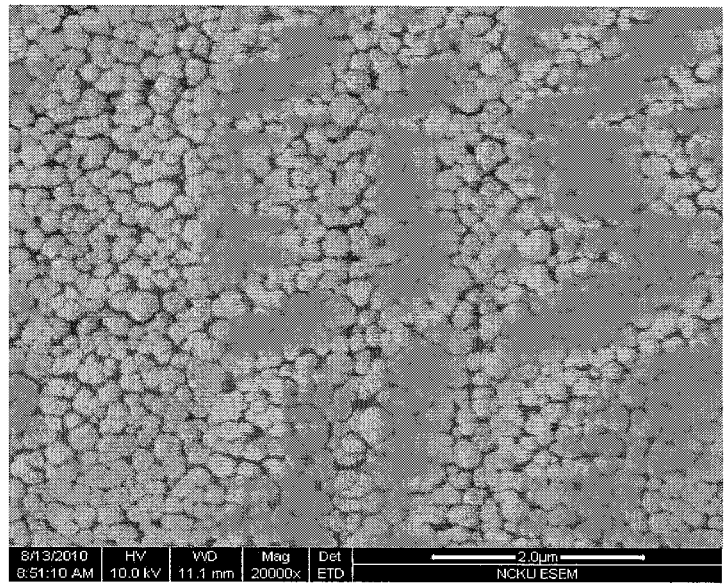
FIG. 2A is a top view of an electron microscope of the electrochromic material layer deposited by performing an oblique sputtering deposition process according to the disclosure.
Figure 2B:
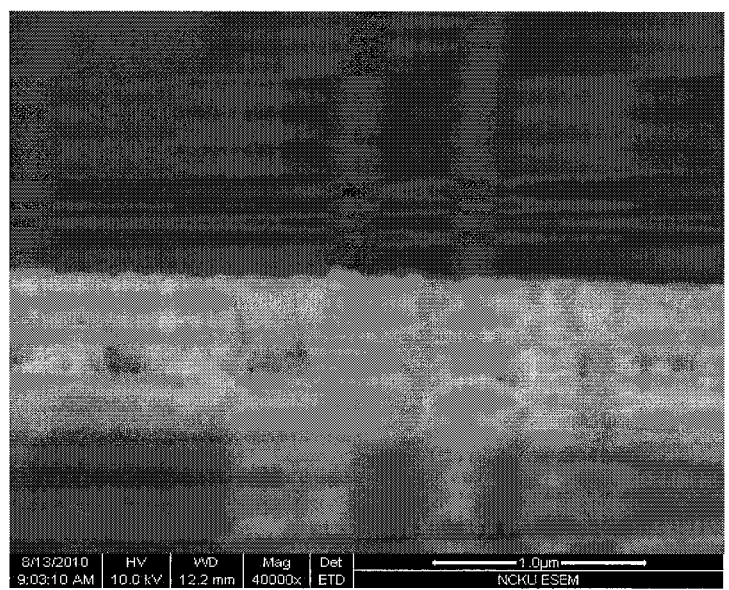
FIG. 2B is a cross-sectional view of FIG. 2A.

FIG. 2A is a top view of an electron microscope of the electrochromic material layer deposited by performing an oblique sputtering deposition process according to the disclosure, and FIG. 2B is a cross-sectional view of FIG. 2A. In FIG. 2A and FIG. 2B, the electrochromic material layer is $WO_3$. It can be known especially from the top view of FIG. 2A that, gaps substantially exist among the nano-microstructures of the deposited electrochromic material, and thus the electrochromic material layer according to the disclosure can effectively increase the specific surface area to above 30%.

It should be noted herein that, by taking $WO_3$ as an example, the coloring state/bleached state switching time of the electrochromic material layer can be computed according to Einstein relation of a Formula 1 below:

$$\tau = L^2/D \quad \text{(Formula 1)}$$

in which $\tau$ is switching time, D is a diffusion coefficient ($D=7\times10^{-10}$ cm$^2$/s, $WO_3$), and L is an effective diffusion distance.

Since the electrochromic material layer according to the disclosure has the nano-microstructures, the effective diffusion distance L can be shortened, and it can be deduced further according to the Formula 1 that the switching time $\tau$ will be shortened. Based on the above, since the electrochromic material layer according to the disclosure can shorten the coloring state/bleached state switching time of the electrochromic material layer, it indicates that the electrochromic material layer according to the disclosure can increase the coloring state/bleached state switching speed.

Further, an effective current can be computed according to Cottrell equation in a Formula 2 below, and increase of the current value means that a greater quantity of ions are in or out in the same time.

$$I_{(limt,t)} = nFAC_i(D_i/\pi t)^{1/2} \quad \text{(Formula 2)}$$

in which I is an effective current, n is the number of electrons transferred, F is a Faraday constant, and A is a reaction specific surface area.

Since the electrochromic material layer according to the disclosure has the nano-microstructures, and gaps substantially exist among the nano-microstructures of the deposited electrochromic material, the electrochromic material layer can effectively increase the reaction specific surface area A to above 30%, and it can be deduced further according to the Formula 2 that, the effective current 2 will increase. Based on the above, since the electrochromic material layer according to the disclosure can increase the effective current in the electrochromic material layer, it indicates that the electrochromic material layer according to the disclosure can improve the coloring state/bleached state contrast.

Next, a method for fabricating a parallax barrier device by using the electrochromic material layer according to the disclosure is described.

Figure 3A:
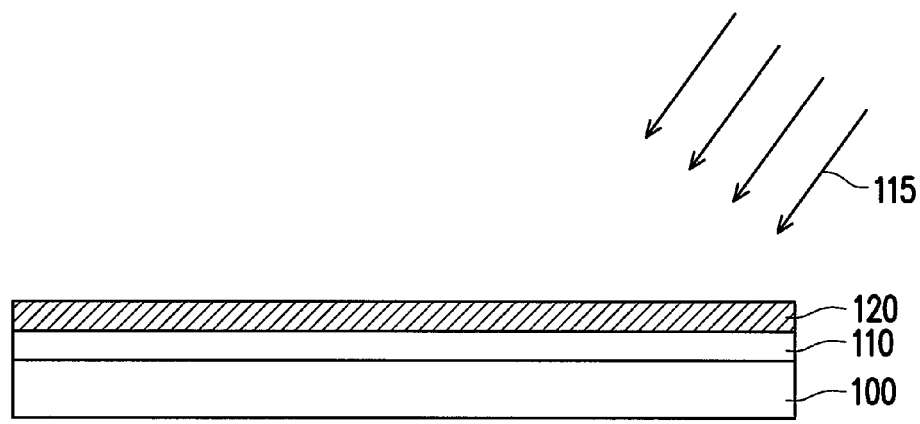
FIG. 3A to FIG. 3D are schematic diagrams illustrating a process of fabricating a parallax barrier device by using the electrochromic material layer according to the disclosure.

Firstly, referring to FIG. 3A, the substrate with a transparent electrode layer 110 formed thereon is provided, and then according to the method for fabricating the electrochromic material layer of the disclosure, an electrochromic material layer 120 having a special structure of the disclosure is formed on the transparent electrode layer 110 with an oblique sputtering deposition process 115.

In one embodiment, the substrate 100 is, for example, transparent glass, polyethylene terephthalate or polyimide. The transparent electrode layer 110 is, for example, ITO, FTO, ATO or ZnO, and the transparent electrode layer 110 is formed with, for example, a sputtering method. The electrochromic material layer 120 is, for example, $WO_3$, $WO_3$ derivatives, $NiO_x$, $NiO_x$ derivatives, $V_2O_5$, $V_2O_5$ derivatives, $TiO_2$, $TiO_2$ derivatives, $IrO_2$, $IrO_2$ derivatives or a combination thereof.

Figure 3B:
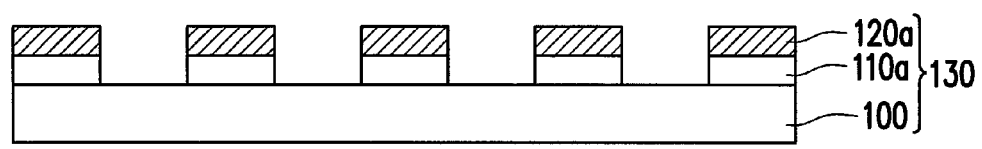

Then, referring to FIG. 3B, a patterning process is performed on the electrochromic material layer 120 and the transparent electrode layer 110, so as to form a patterned electrochromic material layer 120a that is constituted by a plurality of electrochromic structures and a patterned transparent electrode layer 110a, and the patterned electrochromic material layer 120a, the patterned transparent electrode layer 110a, and the substrate 110 further form a first substrate unit 130. In one embodiment, the patterning process is, for example, to remove a part of the electrochromic material layer 120 and the transparent electrode layer 110 with a laser cutting process, or to remove a part of the electrochromic material layer 120 and the transparent electrode layer 110 by means of etching with a mask. Further, in view of the top visual angle, the formed patterns are, for example, a plurality of vertical strip-shaped structures parallel to each other.

Figure 3C:
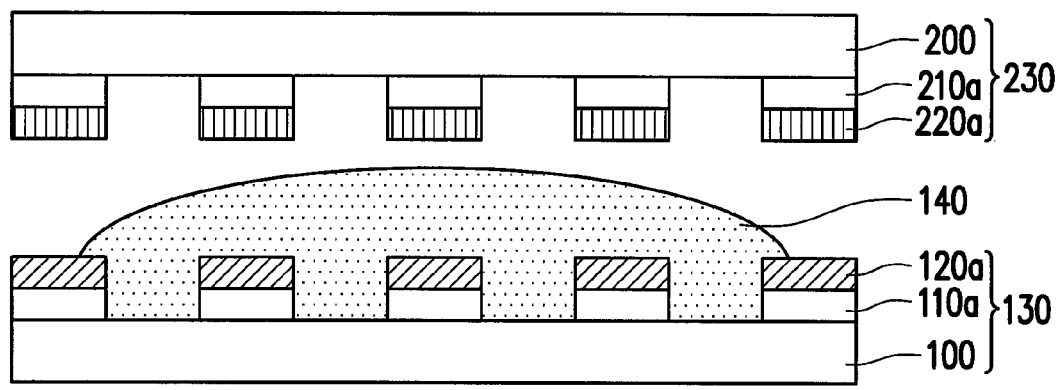

Next, referring to FIG. 3C, a second substrate unit 230 having a patterned electrochromic material layer 220a, a patterned transparent electrode layer 210a, and a substrate 200 is fabricated, and an electrolyte 140 is formed on the first substrate unit 130. In one embodiment, the electrolyte 140 is, for example, a colloid formed by salts containing Li, dispersant, and thickener. The salts containing Li include, for example, $LiClO_4$, $LiN(SO_2CF_3)_2$, $LiO_3SCF_3$, $LiO_3SC_4F_9$, $LiCl$ or $LiPF_6$. The dispersant includes, for example, propylene carbonate, ethylene carbonate, γ-butyrolactone, acetonitrile or dimethyl formamide. The thickener includes, for example, polyethylene glycol (PEG), polypropylene glycol, polyethylene oxide, polyether, polyvinyl alcohol, polymethyl methacrylate, polyacrylonitrile, poly(N,N-dimethylacrylamide), poly(2-(2-methoxyethoxy)-ethoxy)phosphazene) or poly (oxymethylene-oligo(oxyethylene)). The electrolyte 140 is formed with, for example, a coating method or a screen printing method. Alternatively, the electrolyte can be injected prior to the package process. The second substrate unit 230 may be formed with, for example, the same method as that of the first substrate unit 130, and in view of the top visual angle, the formed patterns are, for example, a plurality of vertical strip-shaped structures parallel to each other. Further, patterns of the patterned electrochromic material layer 220a and the patterned transparent electrode layer 210a are, for example, patterns corresponding to the patterned electrochromic material layer 120a and the patterned transparent electrode layer 110a of the first substrate unit 130. However, different from the first substrate unit 130, the electrochromic material layer of the second substrate unit 230 can also be formed by means of a common sputtering deposition process or electroplating process. Therefore, the patterned electrochromic material layer 220a may further be, for example, Prussian blue, polyaniline or a combination thereof, in addition to $WO_3$, $WO_3$ derivatives, $NiO_x$, $NiO_x$ derivatives, $V_2O_5$, $V_2O_5$ derivatives, $TiO_2$, $TiO_2$ derivatives, $IrO_2$, $IrO_2$ derivatives or a combination thereof.

Figure 3D:
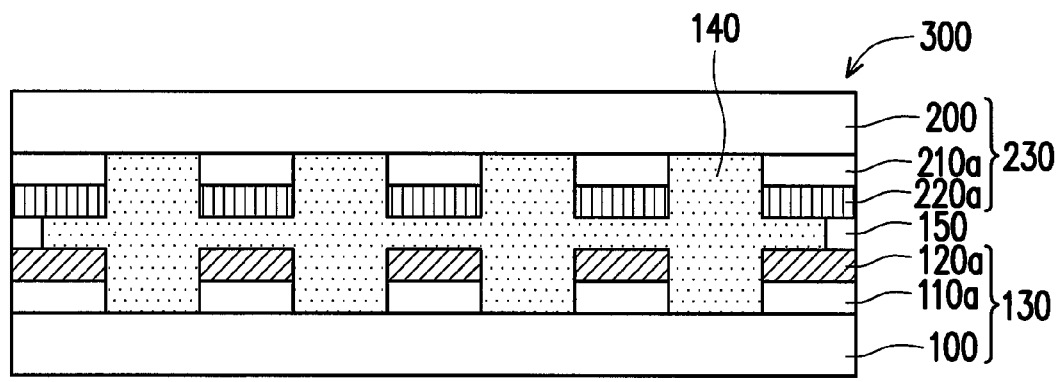

Afterwards, referring to FIG. 3D, the first substrate unit 130 and the second substrate unit 230 are combined and packaged to form a parallax barrier device 300 with the electrochromic material layer according to the disclosure. In one embodiment, the process of combining and packaging the first substrate unit 130 and the second substrate unit 230 is, for example, to form an insulation layer 150 on one of the first substrate unit 130 and the second substrate unit 230, and then the first substrate unit 130 and the second substrate unit 230 are adhered, in which the insulation layer 150 is, for example, formed at a periphery of the substrate in the form of a frame. Here, the insulation layer 150 is a package device, a package adhesive, or an insulation adhesive, for instance. The insulation layer 150 described herein has functions of packaging the electrolyte 140 into the device, insulating the electrolyte 140 from the external surroundings and adhering the substrate units 130 and 230. According to an exemplary embodiment of the disclosure, the insulation layer 150 is disposed between the electrochromic material layer 120a and the electrochromic material layer 220a, and the insulation layer 150 is an adhesion layer.

In the above embodiment, the electrolyte 140 is formed on the first substrate unit 130. However, the disclosure is not limited thereto, and the electrolyte 140 may also be formed on the second substrate unit 230. Further, in the above embodiment, the insulation layer 150 is formed after the formation of the electrolyte 140. However, the disclosure is not limited thereto, and the insulation layer 150 may be formed first and then the electrolyte 140 is formed. Moreover, in the disclosure, the electrolyte 140 may also be formed between the first substrate unit 130 and the second substrate unit 230 in a manner of injection after the first substrate unit 130 and the second substrate unit 230 are combined, and the packaging process is performed at last. Furthermore, in the above embodiment, the second substrate unit 230 having the patterned electrochromic material layer 220a, the patterned transparent electrode layer 210a, and the substrate 200 is provided. However, the disclosure can also fabricate a second substrate unit without a patterned electrochromic material layer, thereby omitting the pattern alignment joint process of the first substrate unit and the second substrate unit.

In the previous exemplary embodiments, when the electrolyte 140 is colloidal, the colloidal electrolyte itself has a support strength and thus can separate two substrates from each other. Accordingly, as shown in FIG. 3D, even though a large-size parallax barrier device is formed, the two substrate units 130 and 230 can be packaged without being deformed. Nonetheless, when the electrolyte 140 is in a liquid state, the substrates of the large-size parallax barrier device may be deformed because the liquid electrolyte itself does not have a support strength, and thereby the two substrate units are in contact with each other. As a result, according to an exemplary embodiment, spacers (not shown) are further configured in the space surrounded by the two substrate units 130 and 230 and the insulation layer 150 when the electrolyte 140 is in a liquid state. Here, the spacers are, for instance, columns formed together with the insulation layer 150 or additional particles.

Next, detailed description is given by listing experimental examples (Experimental Example 1 to Experimental Example 3) for fabricating the electrochromic material layer and the electrochromic device of the disclosure and a comparative example (Comparative Example 1) for fabricating the electrochromic material layer with a common non-oblique sputtering process and the electrochromic device thereof, but the examples below are not intended to limit the scope of the disclosure.

Experimental Example 1

In Experimental Example 1, an oblique sputtering process is performed. The actual process condition of Experimental Example 1 is that the sputtering power is 100 W, the pressure is 5 mTorr, oxygen is 20% of the total gas, the included angle in the sputtering is 78°, the rotation speed is 0.5 rpm, and the sputtering time is 3 hours. A tungsten oxide material is provided to a glass substrate having indium tin oxide (ITO) by performing the oblique sputtering process is performed, and the resultant tungsten oxide layer has a thickness of 580 nm (shown in FIG. 3A), so as to obtain the electrochromic material layer.

Besides, Prussian blue is provided to a glass substrate having ITO by performing a normal plating process on the condition that the external voltage is −1V and the plating time is 10 minutes. The resultant Prussian blue has a thickness of 410 nm.

The tungsten oxide substrate and the Prussian blue substrate are patterned by laser, and the patterned tungsten oxide and the patterned Prussian blue substrate respectively serve as an upper electrode and a lower electrode. The resultant patterns are periodic strip-shaped patterns respectively having the width of 200 nm or not, as indicated in FIG. 3B.

The tungsten oxide substrate and the Prussian blue substrate having the strip-shaped patterns are aligned and adhered by electrolyte, so as to form an electrochromic device S1, as indicated in FIG. 3C and FIG. 3D.

Experimental Example 2

The actual process condition of Experimental Example 2 is that the sputtering power is 100 W, the pressure is 5 mTorr, oxygen is 20% of the total gas, the included angle in the sputtering is 78°, the rotation speed is 2 rpm, and the sputtering time is 3 hours. Other conditions are the same as those in Experimental Example 1, and thereby an electrochromic device S2 is formed.

Experimental Example 3

The actual process condition of Experimental Example 3 is that the sputtering power is 100 W, the pressure is 5 mTorr, oxygen is 20% of the total gas, the included angle in the sputtering is 88°, the rotation speed is 0.5 rpm, and the sputtering time is 3 hours. Other conditions are the same as those in Experimental Example 1, and thereby an electrochromic device S3 is formed.

Comparative Example 1

The Comparative Example 1 is a common sputtering process, and the actual process condition thereof is that the sputtering power is 100 W, the pressure is 5 mTorr, oxygen is 20% of the total gas, the included angle in the sputtering is 0° (not oblique), and the sputtering time is 1 hour. Other conditions are the same as those in Experimental Example 1, and thereby an electrochromic device N1 is formed.

Figure 4:
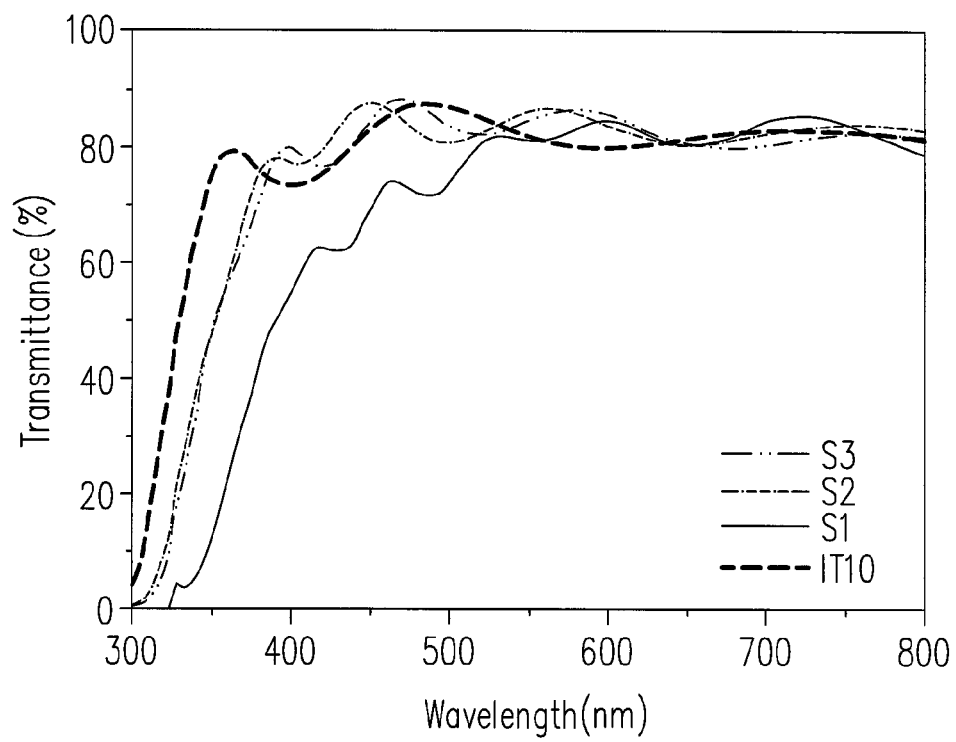
FIG. 4 is a schematic diagram illustrating transmittance of an electrochromic material layer and a transparent conductive substrate according to the disclosure.

FIG. 4 is a schematic diagram illustrating transmittance of an electrochromic material layer and a transparent conductive substrate according to the disclosure. It can be known from FIG. 4 that, in the field of the visible light wavelength, the electrochromic material layers S1, S2, and S3 in the electrochromic devices S1, S2, and S3 of the disclosure have a transmittance close to that of a transparent conductive substrate compared with the transparent conductive substrate having a transparent electrode layer (ITO). Thus, a better transmittance can be achieved in the case of the electrochromic material layer of the disclosure.

Figure 5:
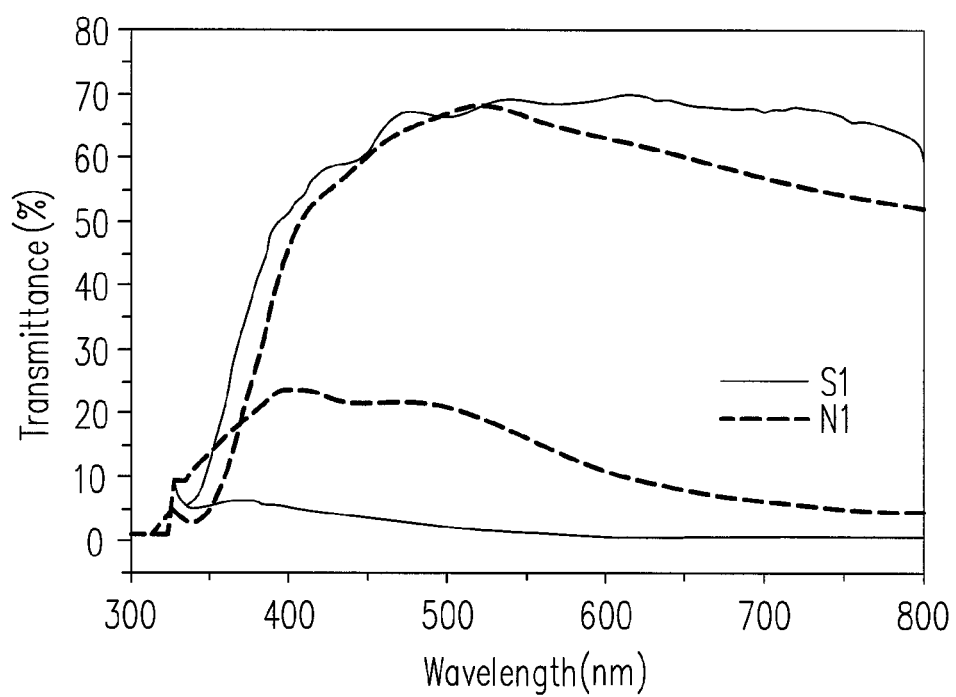
FIG. 5 is a schematic diagram illustrating coloring state/bleached state transmittance of an electrochromic device with the electrochromic material layer according to the disclosure and an electrochromic device without the electrochromic material layer according to the disclosure.

FIG. 5 is a schematic diagram illustrating coloring state/bleached state transmittance of an electrochromic device with the electrochromic material layer according to the disclosure and an electrochromic device without the electrochromic material layer according to the disclosure. It can be known from FIG. 5 that, by comparing the electrochromic device S1 of the electrochromic material layer using the oblique sputtering process with the electrochromic device N1 of the electrochromic material layer using the common sputtering process, the bleached state transmittance of the electrochromic device S1 using the oblique sputtering process is higher than that of the electrochromic device N1, and further has a transmittance of about 70% in the field of the visible light wavelength. Moreover, the coloring state transmittance of the electrochromic device S1 is lower than the bleached state transmittance of the electrochromic device N1, and further has a transmittance below 10% in the field of the visible light wavelength. Furthermore, the optical density (OD) of the electrochromic device N1 is 0.8, and with respect to this, the electrochromic device S1 using the oblique sputtering process can reach above 1.7. Based on the above, by comparing the electrochromic device S1 of the electrochromic material layer using the oblique sputtering process in the disclosure with the electrochromic device N1 using the common sputtering process, the electrochromic device S1 has a better coloring state contrast.

Figure 6:
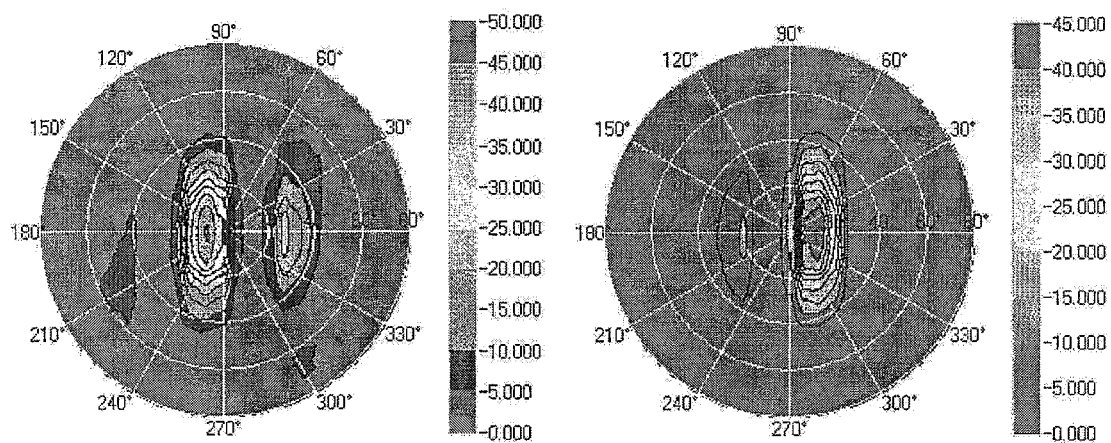
FIG. 6 is a diagram showing the polarization intensity of a digital photo frame of an electrochromic device S1 according to the disclosure.

In addition, the electrochromic device S1 acting as the parallax barrier device is adhered to a digital photo frame, and the digital photo frame is measured by an angular spectrum testing device, so as to confirm on whether the electrochromic device S1 described in the exemplary embodiments can accomplish the parallax barrier effects. First, a voltage of 3V is applied to the electrochromic device S1 to color the electrochromic device S1, the digital photo frame is placed on a carrier, and the focal length of the angular spectrum testing device is aligned to the middle of the digital photo frame right. Here, the digital photo frame serves as the light source, and the testing frame is a completely dark frame. The white, strip-shaped pixels in the middle of the left-eye frame and the right-eye frame are turned on, respectively, and the resultant polarization intensity is shown in FIG. 6. Here, the left figure indicates the polarization intensity of the left-eye frame, and the right figure indicates the polarization intensity of the right-eye frame.

Figure 7:
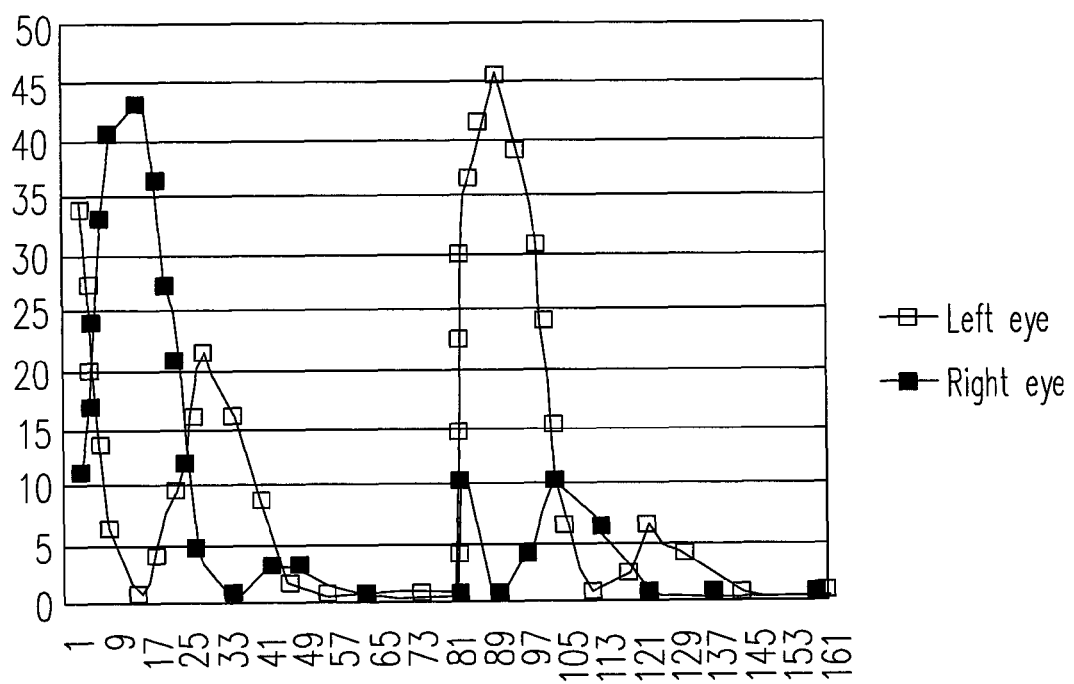
FIG. 7 is a curve diagram showing the distribution of polarization intensity in a horizontal direction)(180°-0° depicted in FIG. 6.

The frames at the horizontal direction (180°-0° in FIG. 6 are then observed, and the curve showing the intensity distribution based on the polarization intensity of the left-eye frame is depicted in FIG. 7. With reference to FIG. 7, the maximum brightness of the left-eye frame is 45.73 cd/m$^2$; when the curve showing the brightness of the left-eye frame is extended and intersects the curve showing the brightness of the right-eye frame, it can be learned that the brightness of the right-eye frame at the same angle is 0.76 cd/m$^2$. According to the following formula obtained by using the angular spectrum testing device, $$\text{Crosstalk } I_{R,cross}/I_{L,max} \qquad \text{(Formula 3)}$$

it can be learned that Crosstalk=0.76/45.73=0.0166.

As indicated in FIG. 6, FIG. 7, and Formula 3, the intensity of the left-eye frame and the right-eye frame in the same image is different, i.e., the electrochromic device S1 described in the exemplary embodiments of the disclosure can achieve the parallax barrier effect.

In view of the above, the disclosure at least has the following advantages.

1. Upon comparison with the conventional parallax barrier device using the liquid crystal material, the parallax barrier device of the disclosure has advantages of a simple process, a low cost, no additionally increased polarizer, an easy controller, a low brightness influence, being applicable to various kinds of displays, saving energy, being applicable to a flexible substrate, and being capable of assembling members externally.

2. The disclosure further provides an electrochromic material layer using the oblique sputtering process, which can improve coloring state/bleached state switching speed and contrast upon comparison with an electrochromic material layer using the common sputtering process, and thus the parallax barrier device can be fabricated with an electrochromic material layer.

Besides, although in the disclosure, the electrochromic material layer is only applied to fabrication of a parallax barrier device in the stereoscopic display technology, but it is not limited thereto, and the electrochromic material layer in the disclosure can also be applied to, for example, smart windows capable of adjusting incident energy of indoor sunlight, anti-dazzling rear view mirrors of cars, sun roofs in the cars, static pattern billboards or static display devices, electronic papers or reflective displays.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A parallax barrier device, comprising:
   a first substrate;
   a first patterned transparent electrode layer, disposed on the first substrate;
   a first patterned electrochromic material layer, disposed on the first patterned transparent electrode layer, comprising a plurality of electrochromic structures, wherein lengths, widths or diameters of the electrochromic structures are 50 nm to 500 nm, and an included angle of the electrochromic structures and a surface of the first substrate to be deposited is 30° to 89°;
   a second substrate;
   a second patterned transparent electrode layer, disposed relative to the first patterned transparent electrode layer on the second substrate;
   a second patterned electrochromic material layer, disposed relative to the first patterned electrochromic material layer on the second patterned transparent electrode layer; and
   an electrolyte, disposed between the first patterned electrochromic material layer and the second patterned electrochromic material layer.

2. The parallax barrier device according to claim 1, wherein the first patterned transparent electrode layer, the first patterned electrochromic material layer, the second patterned transparent electrode layer, and the second patterned electrochromic material layer comprise corresponding patterns.

3. The parallax barrier device according to claim 1, wherein patterns of the first patterned transparent electrode layer, the first patterned electrochromic material layer, the second patterned transparent electrode layer, and the second patterned electrochromic material layer are a plurality of vertical strips parallel to each other.

4. The parallax barrier device according to claim 1, wherein the first electrochromic material layer or the second electrochromic material layer are selected from the group consisting of $WO_3$, $WO_3$ derivatives, $NiO_x$, $NiO_x$ derivatives, $V_2O_5$, $V_2O_5$ derivatives, $TiO_2$, $TiO_2$ derivatives, $IrO_2$, $IrO_2$ derivatives, Prussian blue and polyaniline.

5. The parallax barrier device according to claim 1, further comprising an insulation layer disposed between the first electrochromic material layer and the second electrochromic material layer.

6. The parallax barrier device according to claim 5, wherein the insulation layer is an adhesion layer.

7. The parallax barrier device according to claim 1, wherein the electrolyte is a colloidal electrolyte and serves as an insulation layer between the first electrochromic material layer and the second electrochromic material layer.

8. The parallax barrier device according to claim 1, wherein the first substrate or the second substrate is glass, polyethylene terephthalate or polyimide.

9. The parallax barrier device according to claim 1, wherein the first patterned transparent electrode layer or the second patterned transparent electrode layer is selected from the group consisting of indium doped tin oxide (ITO), fluorine doped tin oxide (FTO), Antimony doped tin oxide (ATO) and Zinc oxide (ZnO).

10. A method for fabricating a parallax barrier device, comprising:

forming a first transparent electrode layer on a first substrate, forming a first electrochromic material layer on the first transparent electrode layer, wherein a method of forming the first electrochromic material layer comprises: rotating the first substrate in a sputtering chamber, and depositing an electrochromic material on the first transparent electrode layer with an oblique sputtering deposition process, wherein the oblique sputtering deposition process comprises: making an included angle of a normal of a target material relative to a normal of a surface of the substrate to be deposited be 30° to 89°, and charging a process gas in the sputtering chamber to perform a sputtering process;

patterning the first electrochromic material layer and the first transparent electrode layer to form a first patterned electrochromic material layer and a first patterned transparent electrode layer;

forming a second transparent electrode layer on a second substrate;

forming a second electrochromic material layer on the second transparent electrode layer;

patterning the second electrochromic material layer and the second transparent electrode layer to form a second patterned electrochromic material layer and a second patterned transparent electrode layer; and providing an electrolyte, and combining and packaging the first substrate and the second substrate in a manner of sandwiching the electrolyte between the first patterned electrochromic material layer and the second patterned electrochromic material layer.

11. The method for fabricating a parallax barrier device according to claim 10, wherein the first patterned transparent electrode layer, the first patterned electrochromic material layer, the second patterned transparent electrode layer, and the second patterned electrochromic material layer comprise corresponding patterns.

12. The method for fabricating a parallax barrier device according to claim 10, wherein patterns of the first patterned transparent electrode layer, the first patterned electrochromic material layer, the second patterned transparent electrode layer, and the second patterned electrochromic material layer are a plurality of vertical strips parallel to each other.

13. The method for fabricating a parallax barrier device according to claim 10, wherein the target material is selected from the group consisting of W, Ni, V, Ti, Ir, $WO_3$, $NiO_x$, $V_2O_5$, $TiO_2$ and $IrO_2$, and the process gas comprises a mixed gas of argon and oxygen.

14. The method for fabricating a parallax barrier device according to claim 10, wherein a rotation speed of the substrate is 0.1 rpm to 1000 rpm.

15. The method for fabricating a parallax barrier device according to claim 10, wherein a method for forming the second electrochromic material layer is the same as the method for forming the first electrochromic material layer.

16. The method for fabricating a parallax barrier device according to claim 10, wherein the first electrochromic material layer comprises a plurality of electrochromic structures, lengths, widths or diameters of the electrochromic structures are 50 nm to 500 nm, and an included angle of the electrochromic structures and a surface of the first substrate to be deposited is 30° to 89°.

17. The method for fabricating a parallax barrier device according to claim 10, wherein the first electrochromic material layer or the second electrochromic material layer is selected from the group consisting of $WO_3$, $WO_3$ derivatives, $NiO_x$, $NiO_x$ derivatives, $V_2O_5$, $V_2O_5$ derivatives, $TiO_2$, $TiO_2$ derivatives, $IrO_2$, $IrO_2$ derivatives, Prussian blue and polyaniline.

18. The method for fabricating a parallax barrier device according to claim 10, wherein the first substrate or the second substrate is glass, polyethylene terephthalate or polyimide.

19. The method for fabricating a parallax barrier device according to claim 10, wherein the first patterned transparent electrode layer and or second patterned transparent electrode layer is selected from the group consisting of indium doped tin oxide (ITO), fluorine doped tin oxide (FTO), Antimony doped tin oxide (ATO) and Zinc oxide (ZnO).

* * * * *